United States Patent
Geneix et al.

(10) Patent No.: US 11,748,329 B2
(45) Date of Patent: Sep. 5, 2023

(54) UPDATING A MULTI-TENANT DATABASE CONCURRENT WITH TENANT CLONING

(71) Applicant: salesforce.com, inc., San Francisco, CA (US)

(72) Inventors: Stephane Geneix, an Francisco, CA (US); Simon Y. Wong, San Carlos, CA (US); Randy Spalten, Manteca, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/779,321

(22) Filed: Jan. 31, 2020

(65) Prior Publication Data

US 2021/0240689 A1   Aug. 5, 2021

(51) Int. Cl.
   *G06F 16/23*   (2019.01)
   *G06F 11/14*   (2006.01)

(52) U.S. Cl.
   CPC ...... *G06F 16/2343* (2019.01); *G06F 11/1451* (2013.01); *G06F 2201/80* (2013.01)

(58) Field of Classification Search
   CPC ............. G06F 16/2343; G06F 11/1451; G06F 2201/80
   See application file for complete search history.

(56) References Cited

U.S. PATENT DOCUMENTS

| | | | |
|---|---|---|---|
| 6,883,020 B1 * | 4/2005 | Taranto | G06F 16/9574 709/219 |
| 7,055,034 B1 * | 5/2006 | Levy | G06T 1/005 380/201 |
| 10,452,374 B2 | 10/2019 | Sapaliga et al. | |
| 10,545,987 B2 | 1/2020 | Borowiec et al. | |
| 10,547,676 B2 | 1/2020 | Abuelsaad et al. | |
| 2002/0133507 A1 * | 9/2002 | Holenstein | G06F 11/2064 |
| 2002/0133512 A1 * | 9/2002 | Milillo | G06F 11/2082 |
| 2006/0212450 A1 * | 9/2006 | Earhart | G06F 9/526 |
| 2010/0198917 A1 * | 8/2010 | Petersen | H04L 67/22 709/204 |
| 2011/0313972 A1 * | 12/2011 | Albouze | G06F 16/178 707/610 |
| 2013/0332770 A1 * | 12/2013 | Thiel | G06F 11/2094 714/15 |
| 2016/0063655 A1 * | 3/2016 | Piconi | G06Q 50/20 705/326 |
| 2019/0205455 A1 * | 7/2019 | Jugel | G06F 16/2365 |
| 2019/0354310 A1 * | 11/2019 | Tsirkin | G06F 12/0802 |

* cited by examiner

*Primary Examiner* — Allen S Lin (74) *Attorney, Agent, or Firm* — Kowert, Hood, Munyon, Rankin & Goetzel, P.C.; Paul T. Seegers; Dean M. Munyon (57) ABSTRACT

The present disclosure is directed to updating a multi-tenant database concurrent with tenant cloning. In some embodiments, a computer system receives a request to perform an update operation on a multi-tenant database. The update operation includes updating database entries for a plurality of tenants. Responsive to receiving the request, the update operation is initiated. Performing the update operation includes accessing a list identifying database entries awaiting the updating. During the accessing of the list, the update operation holds a lock. When the lock becomes available for acquisition, a clone process is permitted to create, during performance of the update operation, a clone of a tenant's data within the database.

16 Claims, 5 Drawing Sheets

UPDATING A MULTI-TENANT DATABASE CONCURRENT WITH TENANT CLONING

BACKGROUND

Technical Field

This disclosure is directed to databases, and more particularly, databases having multiple tenants.

Description of the Related Art

Companies typically rely on large database systems to manage information. In some cases, companies may outsource the database and management thereof to a third party provider. The third party can then manage the client's data, including performing any desired updates to the data and the format of the database itself.

In recent years, multi-tenant databases have emerged as an option for companies that desire to outsource their database needs. A multi-tenant database may provide database services for a number of different clients. Although the database is provided for multiple clients, a particular client may access their own data through the multi-tenant database to perform operations such as updating the data, deleting portions of the data, and cloning (duplicating) data in the database. Meanwhile, an administrator of the multi-tenant database may perform various operations thereon, such as the addition of data fields used for administrative purposes.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to various embodiments of updating a multi-tenant database concurrent with tenant cloning. A multi-tenant database is a database maintained by a third party for a number of different clients, each of which is a tenant of the database. Each tenant may have exclusive access to their own data with respect to other tenants. From time to time, various tenants may wish to clone (duplicate) their data for various reasons (e.g., to perform various tests thereon). The cloning of a tenant may result in the creation of another tenant that is the duplicate of the original.

In some instances, an administrator of the multi-tenant database may need to perform a task that results in an update of the entire database, and thus all tenants. For example, an administrator may wish to add another field to each of the tenants. In order to perform such updates, an update process run by the administrator may obtain a lock to the entirety of the database, the lock giving the update process exclusive access to the database and the tenants thereof. If the update process maintains the lock during the entirety of the update, tenants that desire to clone their data are inhibited from doing so until the update is complete. If performing the update consumes a significant amount of time, tenants can thus incur a large delay before cloning their data.

The problem described above may be alleviated by the methodology disclosed herein. When an administrator wishes to perform an update for the entirety of a multi-tenant database, the corresponding update process may initially obtain a lock to compile and/or access a list of database tenants. The list may indicate which tenants are awaiting the update (which, initially, may be all tenants). After the initial access of the list, the update process may release the lock and begin performing the update on the various tenants of the database. Concurrent with performing the update, a clone process is permitted to clone the data on another tenant (that is not currently being acted upon by the update process). In creating a clone, a corresponding new tenant is added. If the tenant from which the clone was created has not been updated, the clone process may generate an indication that the new tenant also needs updating, e.g., by adding it to the list. Upon completing updates for all tenants in the initially created list, the update process may re-acquire the lock to determine if any tenants added by the clone process need updating. If so, these tenants may be updated after the lock has been released again. This process may repeat until there are no further tenants to be updated. Various embodiments of this methodology are now discussed in further detail.

Figure 1:
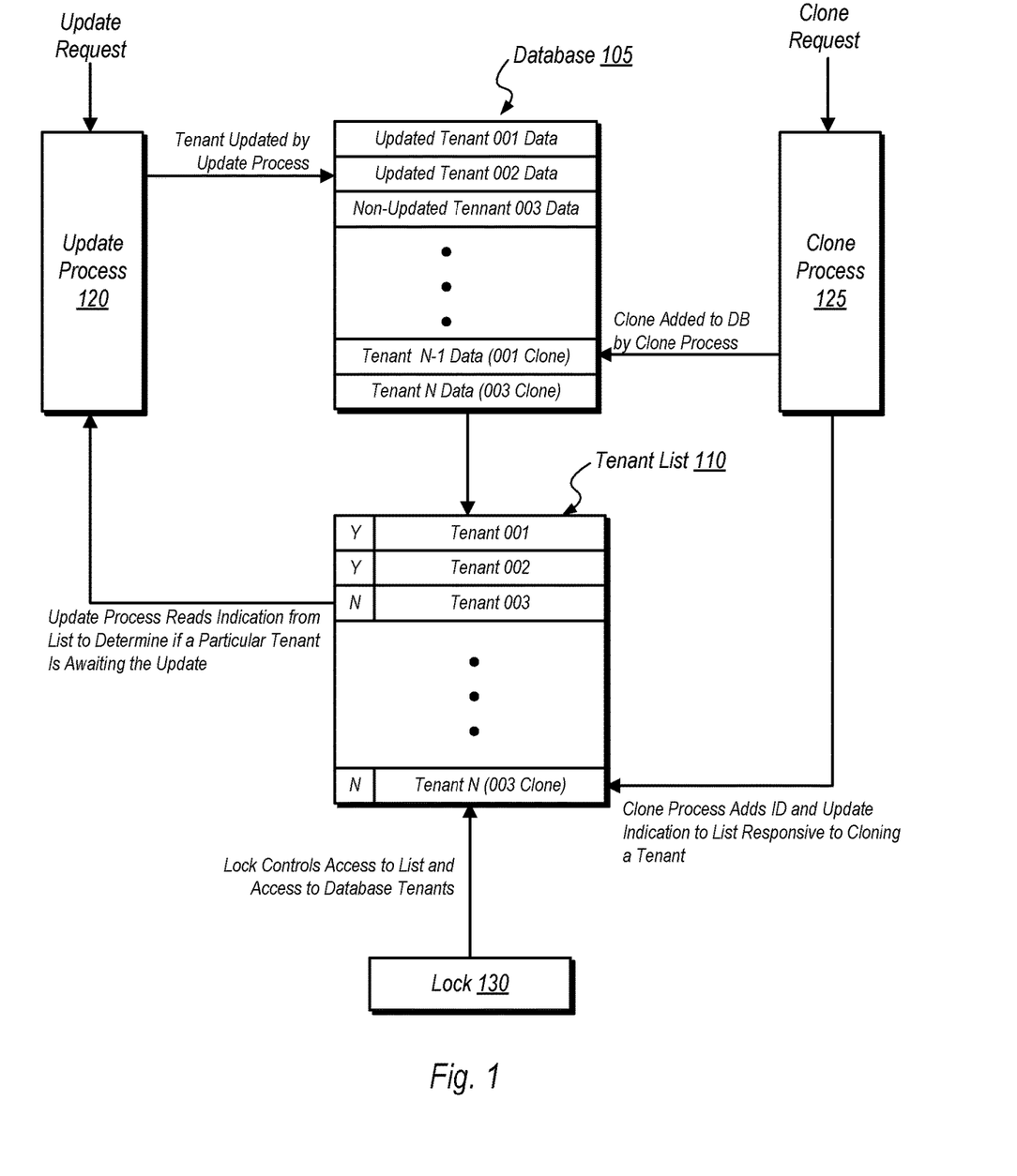
FIG. 1 is a block diagram illustrating one embodiment of methodology for performing an update of tenants in a multi-tenant database concurrent with cloning of tenants.

FIG. 1 is a block diagram illustrating one embodiment of a methodology for performing an update of tenants in a multi-tenant database concurrent with cloning of tenants. In the embodiment shown, a database 105 is a multi-tenant database. Various ones of the tenants may contain data for different clients with respect to one another, although it is possible that some clients of an administrator of the database may have multiple tenants within database 105 (e.g., those that have cloned their data, among others). While various ones of the tenants may store data that is different with respect to the other tenants, each of the tenants may include some commonality with respect to other ones of the tenants. For example, each tenant may include certain fields that are used by an administrator to manage the database as a whole.

Since the various tenants are contained within a single database, there may be times when an administrator needs to update the entirety of the database, and thus each of the tenants therein. Accordingly, an update request may be submitted to update process 120. The update process 120 in the embodiment shown may be any process that performs a common update on multiple tenants of database 105. Such updates may include adding a column or new data field to each tenant, and more generally, may be any change that is performed to each tenant across the entirety of database 105.

Upon receiving the update request, update process 120 may obtain a lock 130. When held by update process 120, lock 130 allows for exclusive access to a tenant list 110. In some embodiments, update process 120 compiles a list of the tenants of database 105. However, tenant list 110 may be a pre-existing list that includes information for all tenants of the database at the time lock 130 was obtained. Furthermore, when update process 120 has control of lock 130, no tenants of database 105 can be added (e.g., due to cloning) or removed. Similarly, having possession of lock 130 by update process 120 inhibits any access to or alteration of tenant list 110 by any other process or other actor.

When update process 120 has access to the tenant list at the beginning of update process 120, it may mark each listed tenant as needing to have the update performed thereon. Upon completing this task, update process 120 may release the lock and begin performing the requested update on the tenants of database 105 as indicated by tenant list 110. As each tenant is updated, update process 120 may also update tenant list 110 to indicate those tenants that have been updated. In the example shown in FIG. 1, tenants 001 and 002 have been updated, and are marked on the list as having received the update (as indicated by the designator 'Y'). Those tenants that have not received the update, such as non-updated tenant 003, are indicated as not having received the update (as indicated by the designator 'N').

It is noted that, in one embodiment, performing the update is an atomic process. That is, update process 120 may perform the update to completion and without interruption. If for some reason update process 120 is unable to complete the update on a particular tenant, that tenant remains unchanged as if no update had been attempted.

Concurrent with performing the update, a clone process 125 may clone (duplicate) tenants in the database. Cloning may be initiated by a clone request received by clone process 125. While the clone process 125 is inhibited from cloning any tenant that is currently undergoing the update by update process 120, it may clone any other tenant, including those that have received the update as well as those have not. Upon completion of a cloning operation, clone process 125 may add a new tenant to database 105, the new tenant being a clone of the original. It is noted that, as with update process 125, cloning performed by clone process 125 may also be an atomic operation that is to be performed to completion. If cloning is interrupted for some reason, no new tenant is added to database 105, and no update to tenant list 110 is performed.

In conjunction with performing a cloning operation, clone process 125 may obtain lock 130. When in possession of lock 130, clone process 125 may obtain control of tenant list 110 to enable it to add the newly created clone (or clones) to the list as a new tenant. It is noted that the new tenant created by the cloning process may not need to be added to the list if the update has already been performed on the tenant from which the clone was created. Upon completing the addition to the list, clone process 125 may release control of the lock until another clone is to be added to the list as a new tenant.

If clone process 125 clones a tenant that has previously been updated by update process 120, the change to the original is propagated to the clone. The clone is then added to database 105 as a new tenant. In the illustrated example, Tenant N-1 is a clone of tenant 001. Since Tenant 001 was updated prior to being cloned, the change to Tenant 001 is thus propagated to Tenant N-1. Accordingly, there is no need for update process 120 to perform the update on Tenant N-1. In this particular embodiment, clone process 125 does not add another entry to Tenant list 110. However, embodiments are possible and contemplated in which clone process 125 would add information regarding a new tenant, created as the result of cloning, to be added to the list, with an indication that the newly added tenant is not in need of the update.

Clone process 125 may also clone tenants that have not previously been updated by update process 125. In the example illustrated in FIG. 1, Tenant N is a clone of Tenant 003. Since Tenant 003 had not undergone any updates by update process 120 at the time it was cloned, both the original and the newly added tenant, Tenant N, are considered to be awaiting the update. In this case, clone process 125, upon completion of the cloning, adds identification information for Tenant N to the list, as well as adding the indication that it is awaiting the update.

After update process 125 has completed the update for all tenants that were on tenant list 110 at the time of its initial access, it may re-acquire possession of lock 130. Again, tenant list 110 is under control of update process 120 when the latter holds lock 130. After lock 130 has been re-acquired, update process 120 may examine tenant list 110 to determine if any additional tenants have been added as the result of cloning. For example, in the illustrated example, update process 120 would find that information for Tenant N has been added to tenant list 110, and that this tenant is awaiting the update. After having examined the list, update process 120 may again release the lock and perform the update on any tenants added due to cloning. Since cloning can occur during the updating of any additional tenants, update process 120 may again obtain lock 130 and re-examine tenant list 110. If any new tenants were added during the previous update cycle, update process 120 may again release lock 130 and perform any additional updates. Generally speaking, this process may be repeated until all tenants in tenant list 110 are indicated as having been updated.

Figure 2:
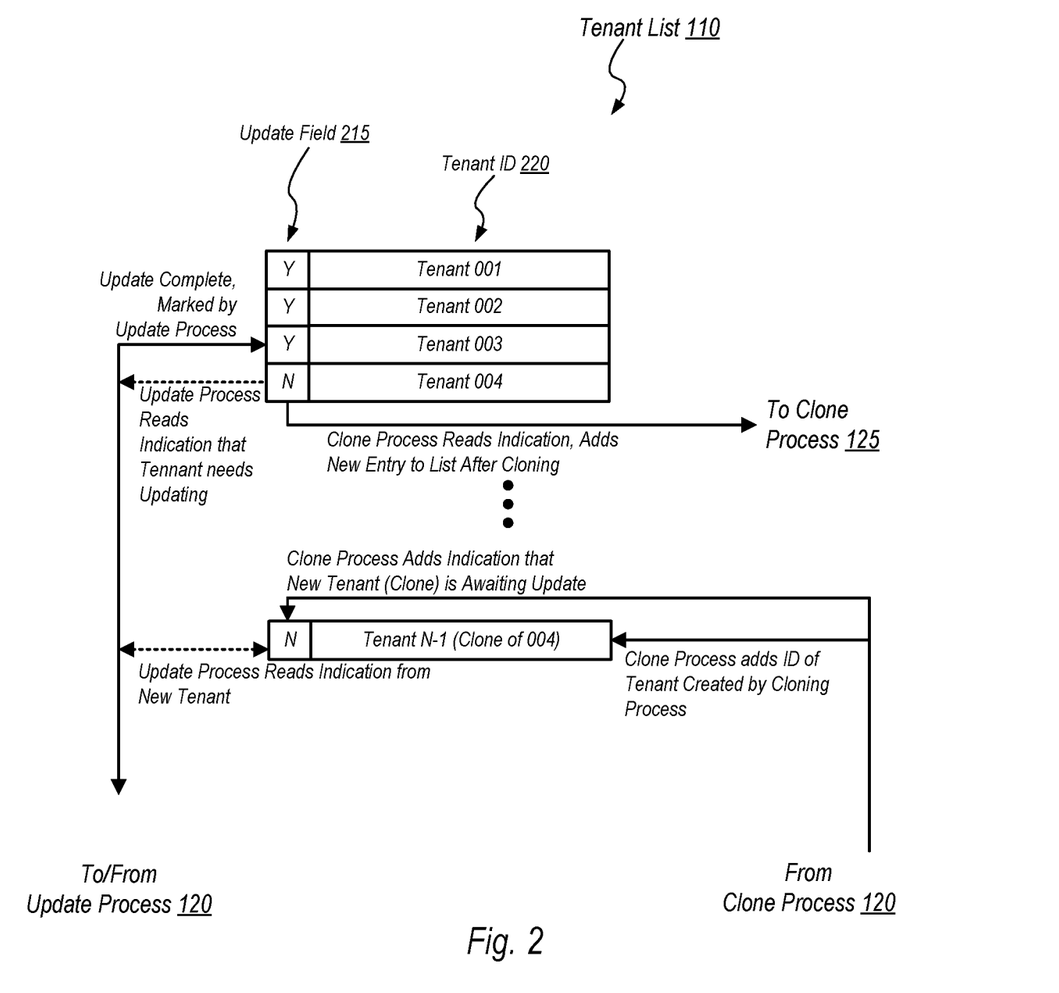
FIG. 2 is a block diagram further illustrating one embodiment of methodology for performing an update of tenants in a multi-tenant database concurrent with cloning of tenants.

FIG. 2 is a block diagram illustrating one embodiment of a tenant list for a multi-tenant database and operations performed thereon. In the embodiment shown, tenant list 110 includes an update field 215 and a tenant ID field 220. The update field 215 may be used by update process 120 to determine if an update has been performed on a tenant identified in tenant ID field 220. As noted above, a 'Y' in update field 215 indicates that the corresponding tenant identified in tenant ID field 220 has received the update. An 'N' in update field 215 indicates that the corresponding tenant identified in tenant ID field 220 has not received the update.

When clone process 125 initiates a cloning operation, it may access tenant list 110 to determine if the tenant to be cloned has undergone the update. Clone process 125 may then use this information to update tenant list 110 upon completion of the cloning operation and the addition of the resulting new tenant to database 105. In this particular example, clone process 125 is to clone the data of Tenant 004, and reads an indication from tenant list 110 that Tenant 004 has not received the update. After completing the cloning operation, clone process 125 adds a new entry to tenant list 110, in tenant ID field 220, identifying the resulting new tenant, Tenant N-1. In the same entry, clone process 125 adds the 'N' indication to update field 215, indicating that Tenant N-1 is awaiting the update.

Update process 120 updates tenant list 110 as updates are completed on each tenant. In the example shown, Tenant 001, Tenant 002, and Tenant 003 have each received the update, and each is marked with a 'Y' indicating the same. Each tenant is initially indicated as awaiting the update (with an 'N') at the time update process 120 first access tenant list 110 after receiving the update request. As update process 120 completes the updates on individual tenants, their corresponding entries in tenant list 110 are updated in the update field 215. Update process 120 may also read from update field 215 to determine which tenants are awaiting the pending update.

It is noted that update process 120 does not necessarily perform updates on tenants in the order they are presented in tenant list 110. In particular, update process may skip over tenants that are undergoing cloning by clone process 125. In some embodiments, update process 120 may keep track of those tenants that were skipped over during the initial pass and return to those tenant for updating prior to re-acquiring lock 130. However, it is also possible and contemplated that update process may return to skipped tenants after lock 130 has been re-acquired following an initial pass over tenant list 110 and corresponding updates of available tenants.

When update process 120 re-acquires lock 130, it may again examine tenant list 110 to determine if any tenants are awaiting the update. In the illustrated example, Tenant N-1, a clone of Tenant 004, is awaiting the update, as indicated by the 'N' in update field 215 of its corresponding entry. Update process 120, upon re-examining the list, may determine that Tenant N-1 is awaiting the update. Responsive to reading this indication, update process 120 may, after releasing lock 130, perform the update on this tenant and update tenant list 110 accordingly.

Figure 3:
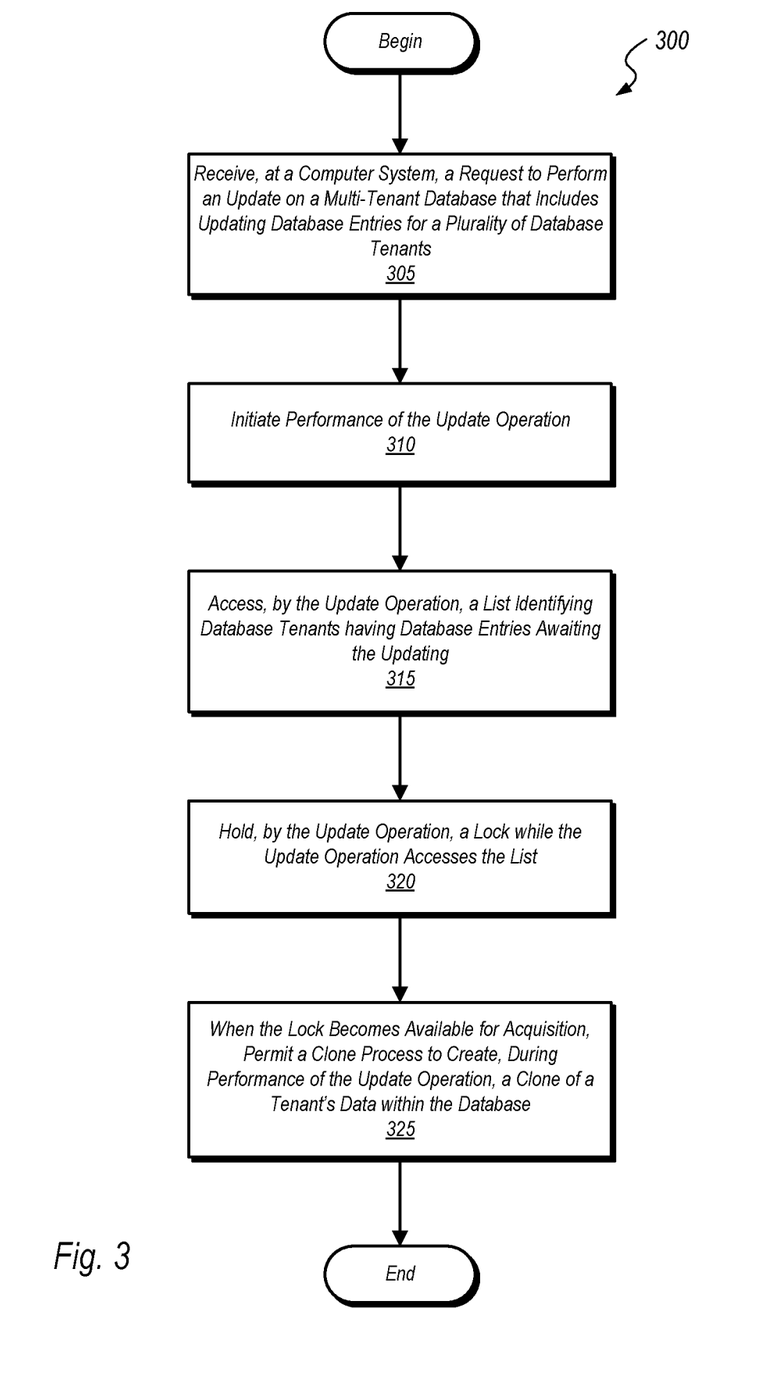
FIG. 3 is a flow diagram illustrating one embodiment of a method for performing an update of tenants in a multi-tenant database concurrent with cloning of tenants.

Method Flow Diagrams:

FIG. 3 is a flow diagram illustrating one embodiment of a method for performing an update of tenants in a multi-tenant database concurrent with cloning of tenants. Method 300 may be performed using various embodiments of the components discussed above.

Method 300 includes receiving, at a computer system, a request to perform an update operation on a multi-tenant database that includes updating database entries for a plurality of database tenants (block 305). In response to receiving the request, the method further includes initiating performance of the update operation (block 310). Performing the update operation includes accessing, by the update operation, a list identifying database tenants having database entries awaiting the updating (block 315). Performing the update operation further includes holding, by the update operation, a lock while the update operation accesses the list (block 320). The method further includes, when the lock becomes available for acquisition, permitting a clone process to create, during performance of the update operation, a clone of a tenant's data within the database (block 325).

In various embodiments, the method further includes re-acquiring the lock by the update operation upon completing updating of the database tenants identified in the list. After the lock has been re-acquired, the method includes determining if any additional tenants have been added to the list during performance of the operation. Subsequent to determining if any additional tenants have been added, the method includes releasing the lock. Thereafter, and responsive to determining that additional tenants have been added, the method includes updating the additional tenants. In the embodiment discussed herein, the additional tenants are clones created by cloning one or more database tenants.

In some embodiments, the method includes, prior to performing the updating of a particular database tenant, creating a clone of the particular tenant concurrent with the update operation performing the updating on another database tenant. Thereafter, the clone process generates an indication that the updating is to be performed by the update operation on the clone. In one embodiment, the indication may be in the form of an entry added to the list of tenants, with the new entry identifying the clone.

Subsequent to the update operation performing the updating on a particular tenant, the method may include creating a clone of the particular tenant and generating an indication that the updating is not to be performed by the update operation on the clone. The method may also include inhibiting the clone process from adding an entry to the list while the update operation is holding the lock. In various embodiments, the updating is an atomic operation. Similarly, cloning, using the clone process, is also an atomic operation in various embodiments.

In some embodiments, the lock, when held by the clone process, permits the clone process to create a clone and to add an indication to the list that the operation is to be performed on the clone. In some embodiments, the adding of the indication may comprise updating the table to add the new tenant (created as a result of the cloning) to the table. Method 300 may also include determining, responsive to receiving the request to perform the operation, determining if the clone process is presently creating a clone corresponding of a particular tenant and acquiring the lock, by the update process, subsequent to the clone process completing creating the clone.

Figure 4:
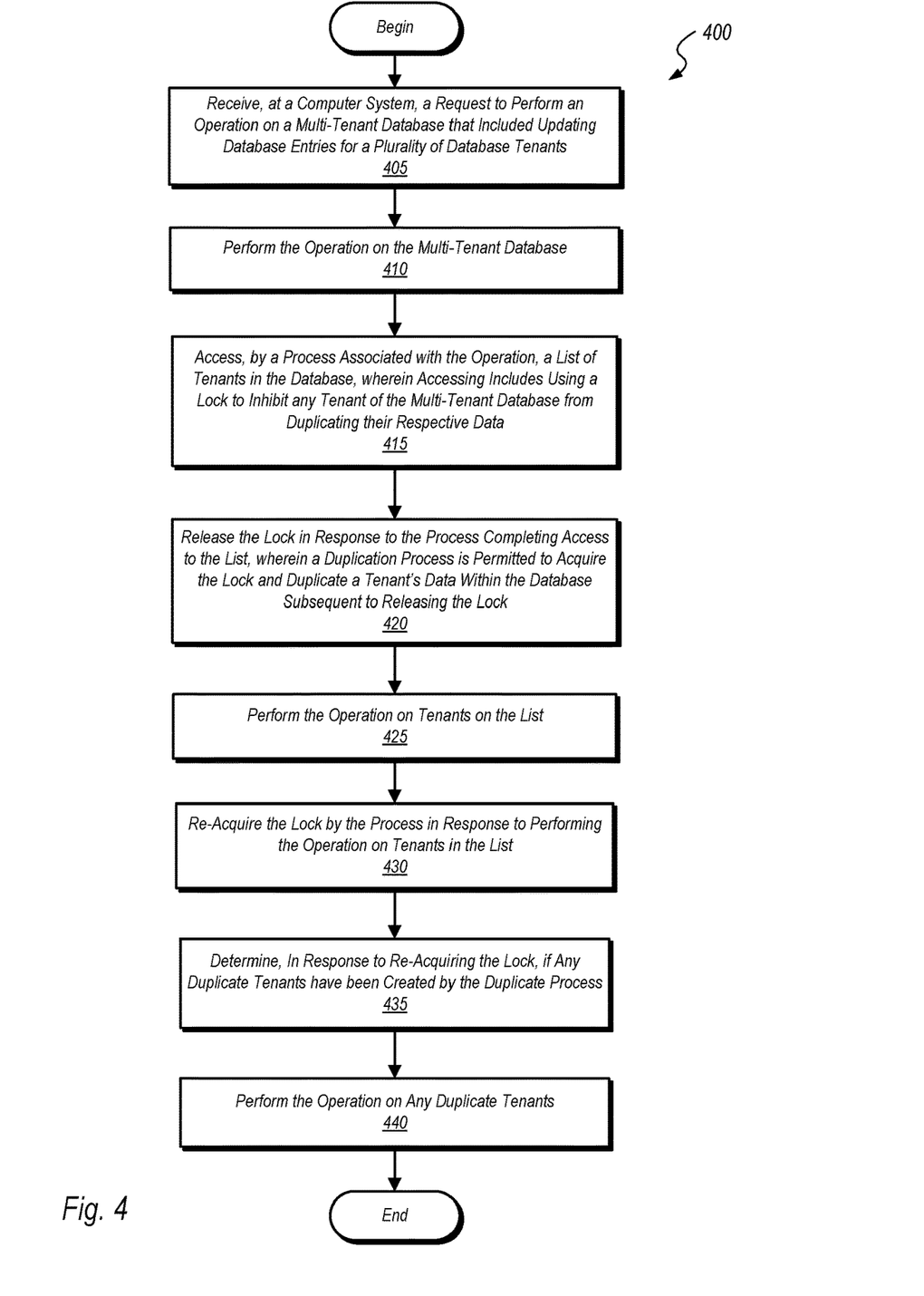
FIG. 4 is a flow diagram illustrating another embodiment of a method for performing an update of tenants in a multi-tenant database concurrent with cloning of tenants.

FIG. 4 is a flow diagram illustrating another embodiment of a method for performing an update of tenants in a multi-tenant database concurrent with cloning of tenants. Similar to Method 300 discussed above, Method 400 may be performed using various embodiments of the components discussed above.

Method 400 includes receiving, at a computer system, a request to perform an operation on a multi-tenant database that includes updating database entries for a plurality of database tenants (block 405), and performing the operation on the multi-tenant database (block 410). Performing the operation includes accessing, by a process associated with the operation, a list of tenants in the database, wherein accessing includes using a lock to inhibit any tenant of the multi-tenant database from duplicating their respective data (block 415). After completing the accessing of the list, performing the operation further includes releasing the lock in response to the process completing access to the list, wherein a duplication (or clone) process is permitted acquire the lock and duplicate a tenant's data within the database subsequent to releasing the lock (block 420). Concurrent with any duplication that may occur at this time, the method also includes performing the operation on tenants in the list (block 425). After completing the operation on all of the tenants initially included in the list, the method includes re-acquiring the lock by the process in response to performing the operation on tenants in the list (block 430). Upon re-acquiring the lock, the method includes determining, in response to re-acquiring the lock, if any duplicate tenants (or clones) have been created by the duplication process (block 435) and performing the operation on any duplicate tenants (block 440).

In various embodiments, the method includes the duplication process acquiring the lock when creating a duplicate of particular tenant. The lock, when acquired by the duplication process, may apply to the particular tenant and the resulting duplicate. The method may further include, prior to the operation updating a particular database tenant, the duplication process creating a duplicate of the particular tenant concurrent with the operation being performed on another tenant. Upon completion of duplicating, the duplication process may generate an indication that the operation is to be performed on the duplicate of the particular tenant. The method further includes inhibiting the duplication process from creating a duplicate of a particular tenant when the operation is being performed on the particular tenant.

Example Computer System

Figure 5:
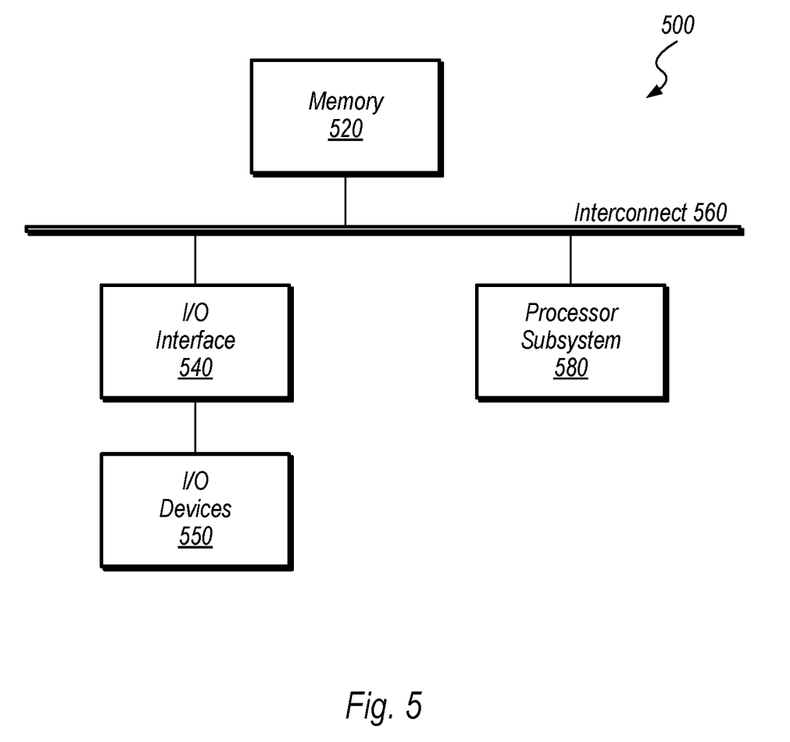
FIG. 5 is a block diagram illustrating one example of a computer system.

Turning now to FIG. 5, a block diagram of an exemplary computer system 600 is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 500 is shown in FIG. 5 for convenience, system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory.

System memory 520 is usable store program instructions executable by processor subsystem 580 to cause system 500 perform various operations described herein, including those discussed above. Accordingly, system memory 520 includes at least one non-transitory computer-readable medium. System memory 520 may encompass instances of different types of memory, and may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device 550 (e.g., configured to communicate over WiFi, Bluetooth, Ethernet, etc.).

Numerous variations and modifications will become apparent to those skilled in the art once the above disclosure is fully appreciated. It is intended that the following claims be interpreted to embrace all such variations and modifications.

What is claimed is:

1. A method, comprising:
   receiving, at a computer system, a request to perform an update operation on a multi-tenant database that includes updating database entries for a plurality of database tenants;
   in response to receiving the request:
      accessing, by an update process of the update operation, a list identifying database tenants having database entries, wherein accessing the list includes identifying ones of the database entries on which the update operation is to be performed;
      holding, by the update process and while the update process accesses the list, a lock to prevent modification of the list by another process;
      releasing the lock in response to the update process completing accessing of the list; and
      performing the update operation while the lock is released;
   during the update operation, updating, by the update process, the list to indicate which database tenants have been updated, wherein a clone process is executable to add update information to the list when the clone process clones a particular database tenant that has not yet been updated by the update process, and wherein the clone process is executable to forgo adding update information to the list when the clone process clones a particular database tenant that has already been updated by the update process; and
   repeating, by the update process:
      obtaining the lock on the list;
      determining whether the list indicates that any remaining tenants need to be updated, including whether the list includes update information indicating that new tenants have been created by the clone process; and
      in response to determining that the list indicates that remaining tenants need to be updated, performing the update operation for one or more of the remaining tenants;
      wherein the repeating is performed until there are no further tenants of the multi-tenant database on which to perform the update operation.

2. The method of claim 1, wherein the any remaining tenants includes at least one tenant for which the update operation was skipped due to the clone process performing cloning of the at least one tenant.

3. The method of claim 1, wherein no update information is added to the list for a clone of an existing tenant if cloning of the existing tenant is interrupted.

4. The method of claim 1, wherein the update operation for a particular tenant is an atomic operation.

5. The method of claim 1, wherein cloning a given database tenant is an atomic operation.

6. The method of claim 1, wherein the clone process is executable to acquire the lock, when available, to duplicate a particular tenant's database entries, wherein the lock, when held by the clone process, permits adding an indication to the list that the update operation needs to be performed by the update process on the particular tenant's database entries, wherein the clone process is executable to release the lock in response to completing duplicating of the particular tenant's database entries.

7. The method of claim 1, further comprising:
   determining, by the update process and in response to receiving the request to perform the update operation, whether the clone process is presently creating a clone corresponding to a particular tenant; and
   acquiring the lock, by the update process, subsequent to the clone process completing creating the clone to identify the ones of the database entries on which the update operation is to be performed.

8. The method of claim 1, wherein the any remaining tenants includes at least one new tenant created by the clone process cloning a particular tenant that was not updated prior to creating the new tenant.

9. A non-transitory computer readable medium having program instructions stored thereon that are capable of causing a computing system to implement operations comprising:
   receiving a request to perform an update operation on database entries for tenants of a multi-tenant database;
   in response to receiving the request, performing the update operation, using an update process, on database entries for the tenants of the multi-tenant database, wherein performing the update includes:
      accessing, using the update process, a list of the database entries, wherein accessing the list includes identifying ones of the database entries on which the update operation is to be performed;
      holding, by the update process and while the update process accesses the list, a lock to prevent modification of the list by another process;
      releasing the lock after the update process completes accessing of the list; and
      performing the update operation while the lock is released; and
   during the update operation, updating, by the update process, the list to indicate which database tenants have been updated, wherein a clone process is executable to add update information to the list when the clone process clones a particular database tenant that has not yet been updated by the update process, and wherein the clone process is executable to forgo adding update information to the list when the clone process clones a particular database tenant that has already been updated by the update process; and
   repeating, by the update process:
      obtaining the lock on the list;
      determining whether the list indicates that any remaining tenants need to be updated, including whether the list includes update information indicating that new tenants have been created by the clone process; and
      in response to determining that the list indicates that remaining tenants need to be updated, performing the update operation for the remaining tenants;
      wherein the repeating is performed until there are no further tenants of the multi-tenant database on which to perform the update operation.

10. The computer readable medium of claim 9, wherein the any remaining tenants includes at least one tenant for which the update operation was skipped due to the clone process performing cloning of the at least one tenant.

11. The computer readable medium of claim 9, wherein the any remaining tenants includes at least one new tenant created by the clone process cloning a particular tenant that was not updated prior to creating the new tenant.

12. The computer readable medium of claim 9, wherein the program instructions are capable of causing the computing system to:
in response to creating a clone of a particular tenant, subsequent to the particular tenant being updated by the update process, forgo generating update information for the clone.

13. The computer readable medium of claim 9, wherein the program instructions are capable of causing the computing system to generate an indication that the update process is to be performed on a clone of a particular tenant in response to the clone being created prior to performing the update operation on the particular tenant.

14. A system comprising:
a computer system including one or more processors and configured to:
receive a request to perform an update operation on a multi-tenant database that includes updating database entries for a plurality of database tenants, wherein the computer system is further configured to, in response to receiving the request:
access, by executing an update process of the update operation, a list identifying database tenants having database entries, wherein accessing the list includes identifying ones of the database entries on which the update operation is to be performed;
hold, by the update process and while the update process accesses the list, a lock to prevent modification of the list by another process;
release the lock in response to the update process completing accessing of the list; and
perform the update operation while the lock is released; during the update operation, update, by the update process, the list to indicate which database tenants have been updated, wherein a clone process is executable to add update information to the list when the clone process clones a particular database tenant that has not yet been updated by the update process, and wherein the clone process is executable to forgo adding update information to the list when the clone process clones a particular database tenant that has already been updated by the update process; and
wherein execution of the update process further includes repeating:
obtaining the lock on the list;
determining whether the list indicates that any remaining tenants need to be updated, including whether the list includes update information indicating that new tenants have been created by the clone process; and
in response to determining that the list indicates that remaining tenants need to be updated, performing the update operation for the remaining tenants;
wherein the repeating is performed until there are no further tenants of the multi-tenant database on which to perform the update operation.

15. The system of claim 14, wherein the any remaining tenants includes at least one tenant for which the update operation was skipped due to the clone process performing cloning of the at least one tenant.

16. The system of claim 14, wherein the computer system is configured to perform the update operation on database entries of a particular tenant as an atomic operation.

* * * * *

UNITED STATES PATENT AND TRADEMARK OFFICE
CERTIFICATE OF CORRECTION

PATENT NO. : 11,748,329 B2
APPLICATION NO. : 16/779321
DATED : September 5, 2023
INVENTOR(S) : Stephane Geneix et al.

It is certified that error appears in the above-identified patent and that said Letters Patent is hereby corrected as shown below:

On the Title Page

Item (72) Inventors, please delete "an Francisco, CA" and insert -- San Francisco, CA --.

Signed and Sealed this
Fourteenth Day of November, 2023

Katherine Kelly Vidal
*Director of the United States Patent and Trademark Office*